ered Statespan Patent [19]

Umezawa et al.

[11] 4,209,812
[45] Jun. 24, 1980

[54] TAPE PLAYER

[75] Inventors: Hiroyuki Umezawa; Hitoshi Okada, both of Toda, Japan

[73] Assignee: Clarion Co., Ltd., Tokyo, Japan

[21] Appl. No.: 930,421

[22] Filed: Aug. 2, 1978

[30] Foreign Application Priority Data

Aug. 9, 1977 [JP] Japan ............................ 52-105790[U]
Aug. 10, 1977 [JP] Japan ................................. 52-95187
Aug. 10, 1977 [JP] Japan ................................. 52-95813

[51] Int. Cl.² .................... G11B 15/26; G11B 15/44; G11B 23/04
[52] U.S. Cl. .................................. 360/96.3; 242/201; 242/206; 360/93; 360/96.2
[58] Field of Search ...................... 360/96, 93, 90, 91, 360/83, 96.1–96.6; 242/197–201, 206, 208, 209

[56] References Cited

U.S. PATENT DOCUMENTS

| 2,658,398 | 11/1953 | Masterson | 242/206 |
| 3,461,249 | 8/1969 | Kamoji et al. | 360/90 |
| 3,610,553 | 10/1971 | Matsuyama | 242/201 |
| 3,767,137 | 10/1973 | Richt et al. | 242/206 |
| 3,782,659 | 1/1974 | Bumb, Jr. | 242/201 |
| 3,791,609 | 2/1974 | Roma | 242/201 |
| 4,031,556 | 6/1977 | Ban et al. | 360/96 |

Primary Examiner—Alfred H. Eddleman
Attorney, Agent, or Firm—Wallenstein, Spangenberg, Hattis & Strampel

[57] ABSTRACT

A tape player having two belts wound around a motor shaft, with one further wound around flywheels provided with capstans and another further wound around a reel shaft drive system, said flywheels and said reel shaft drive system being adapted to be separately rotated by the different belts, respectively.

7 Claims, 13 Drawing Figures

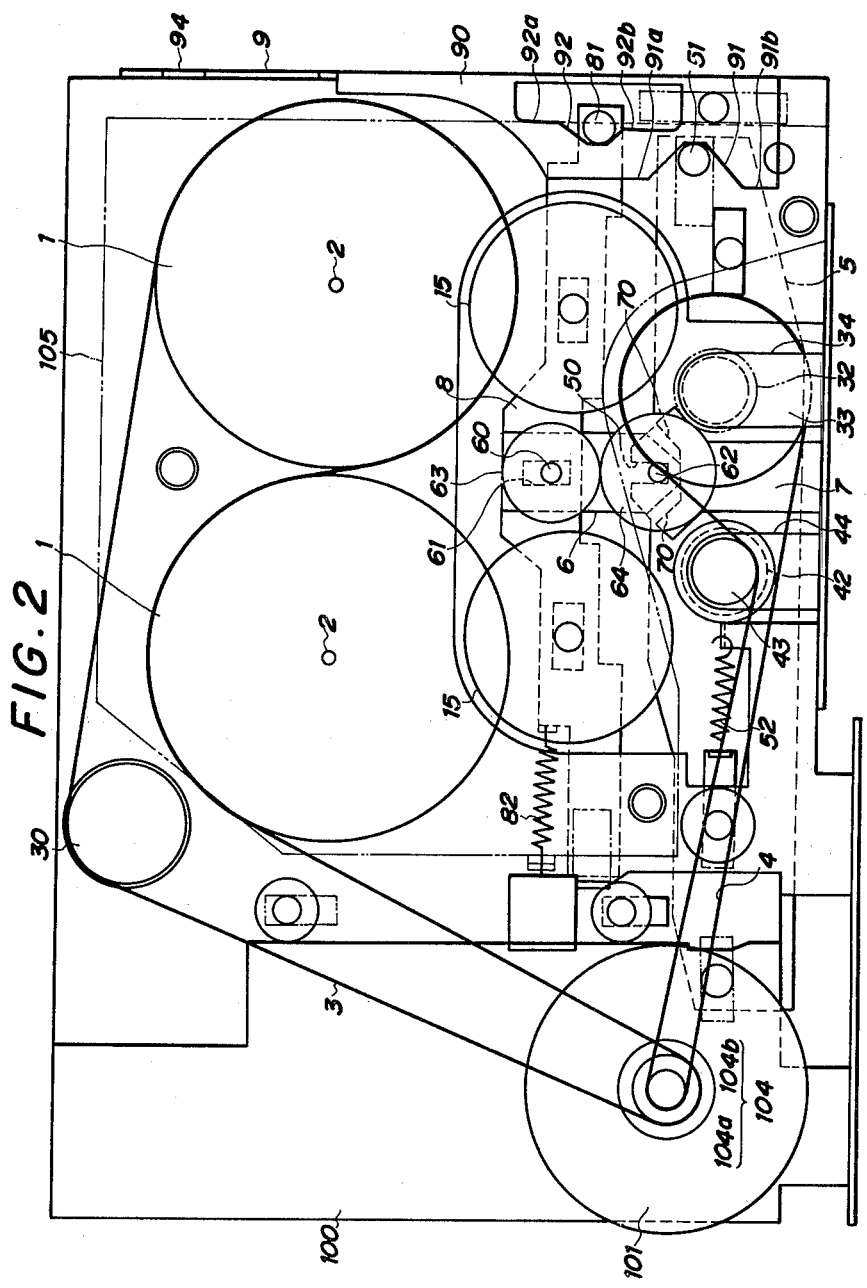

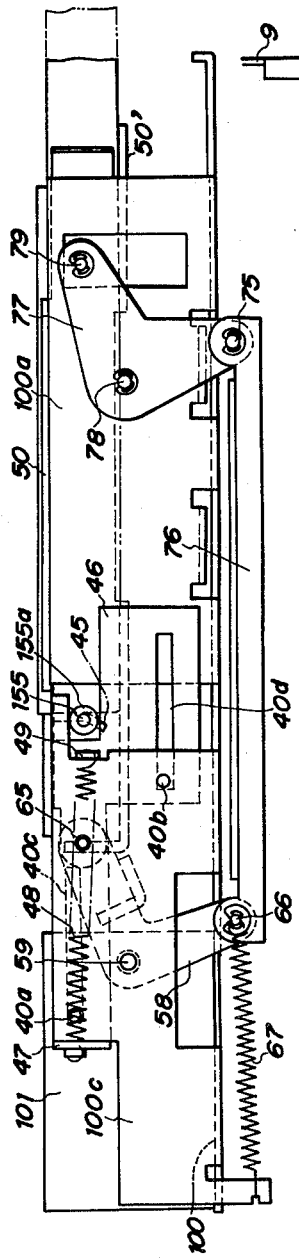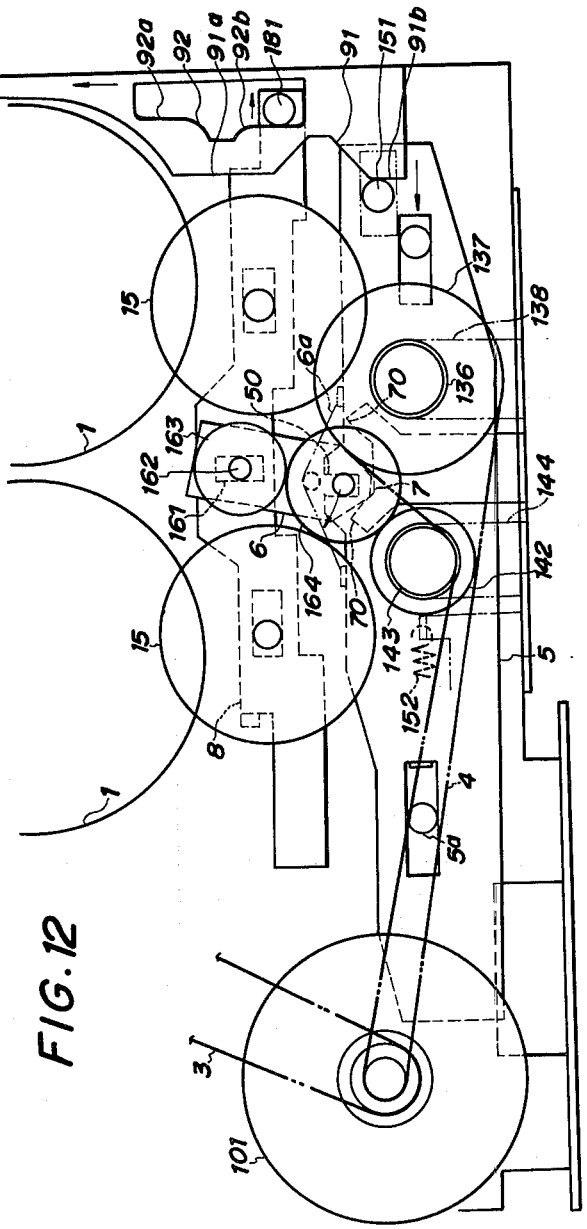

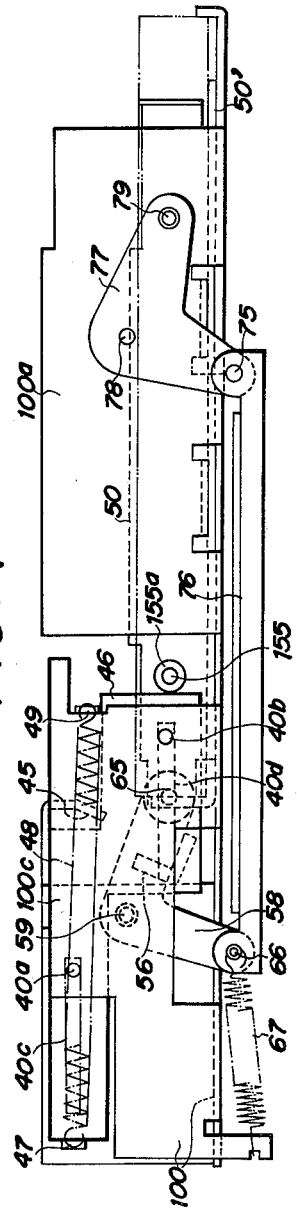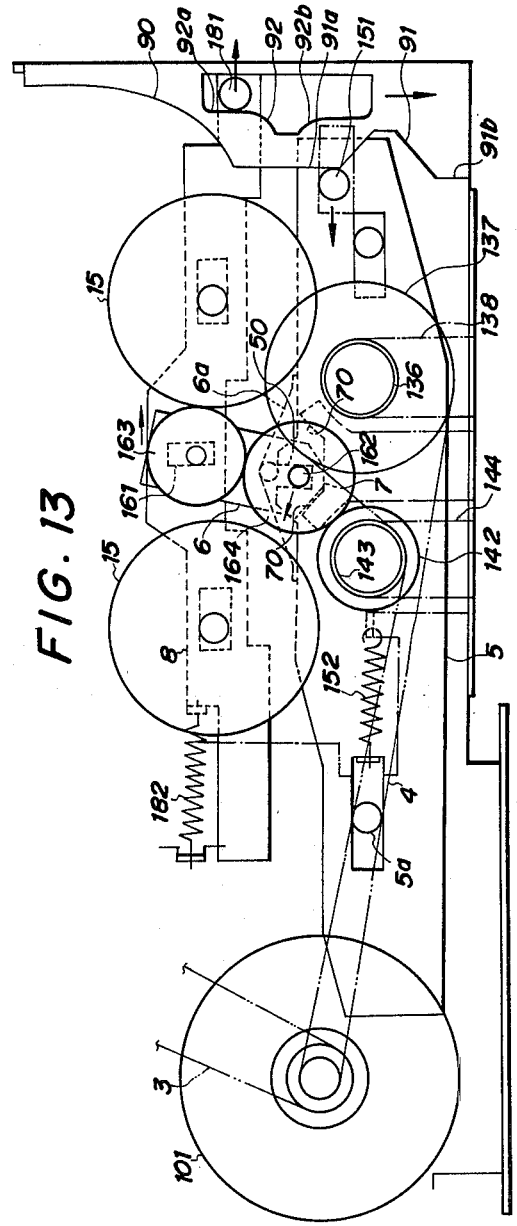

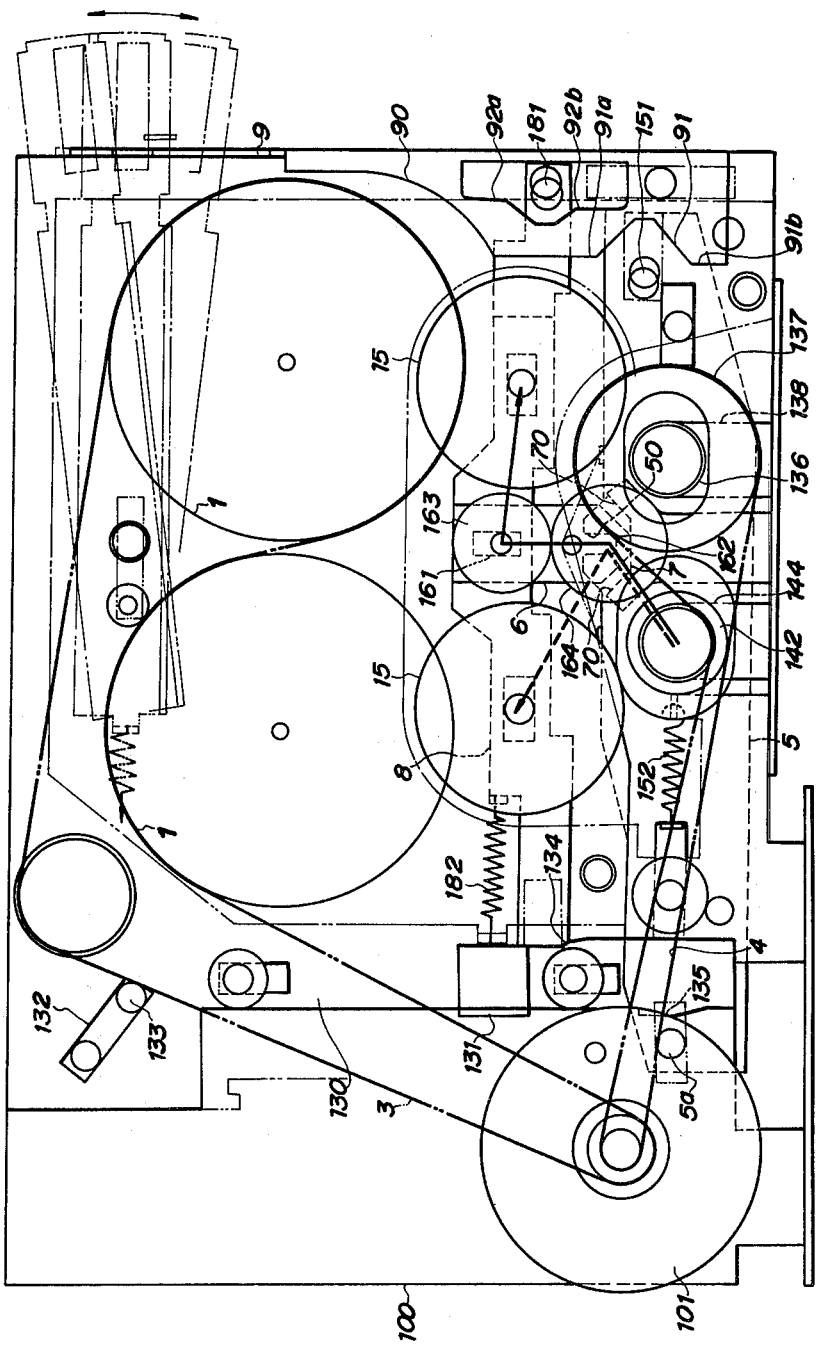

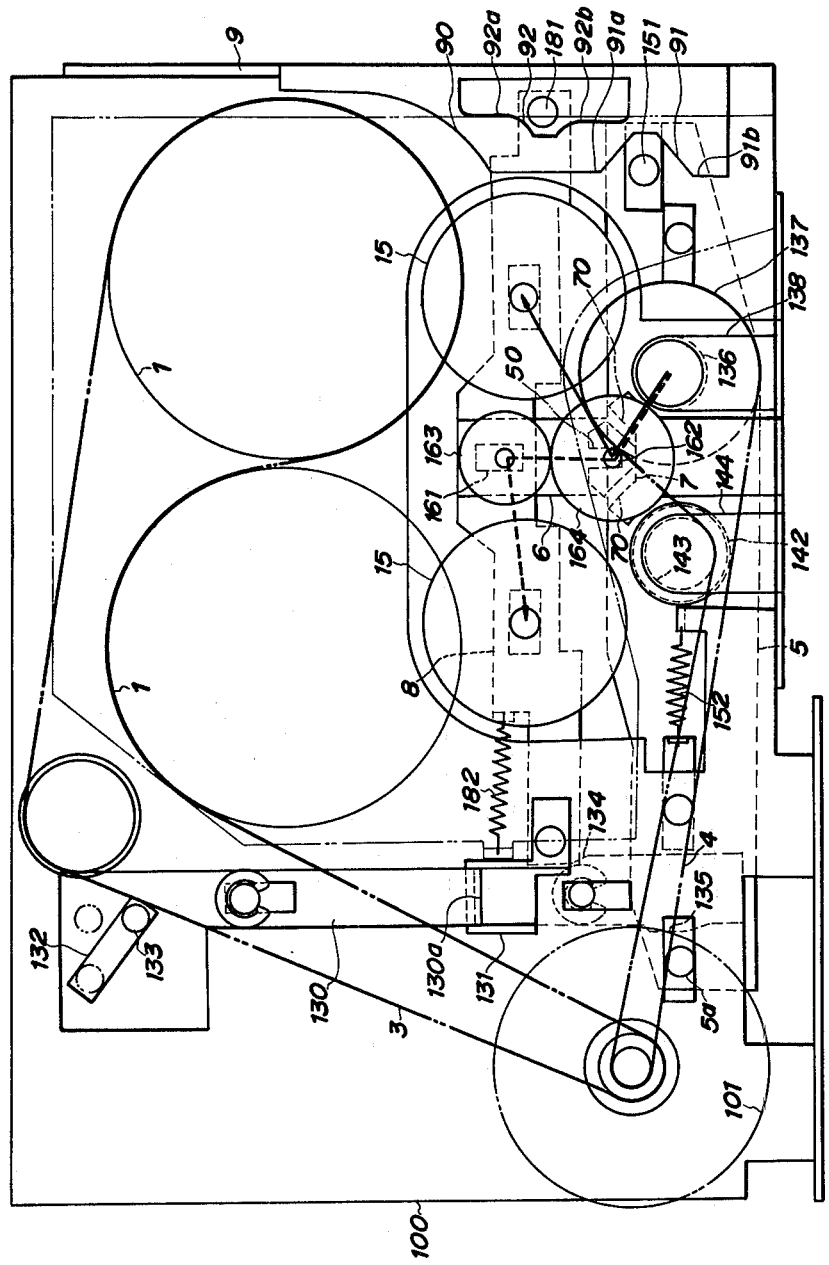

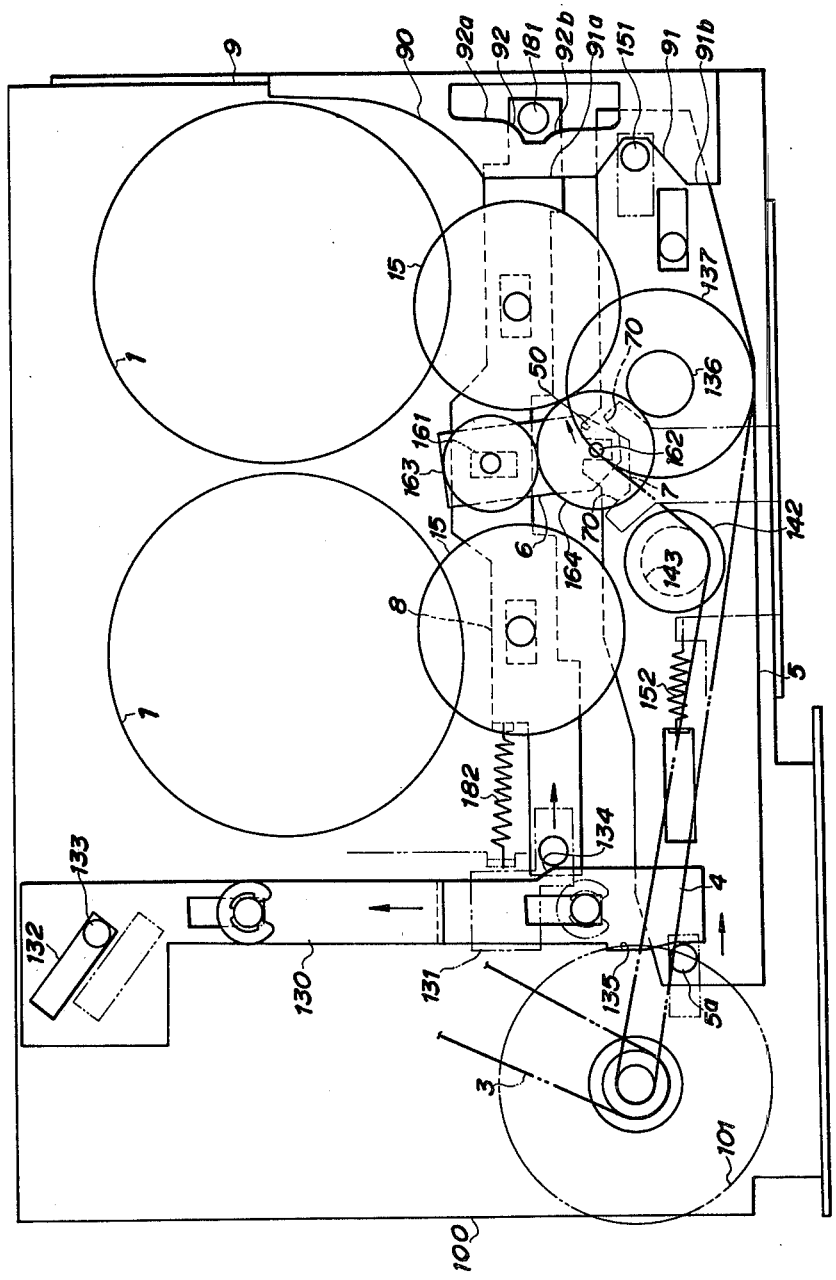

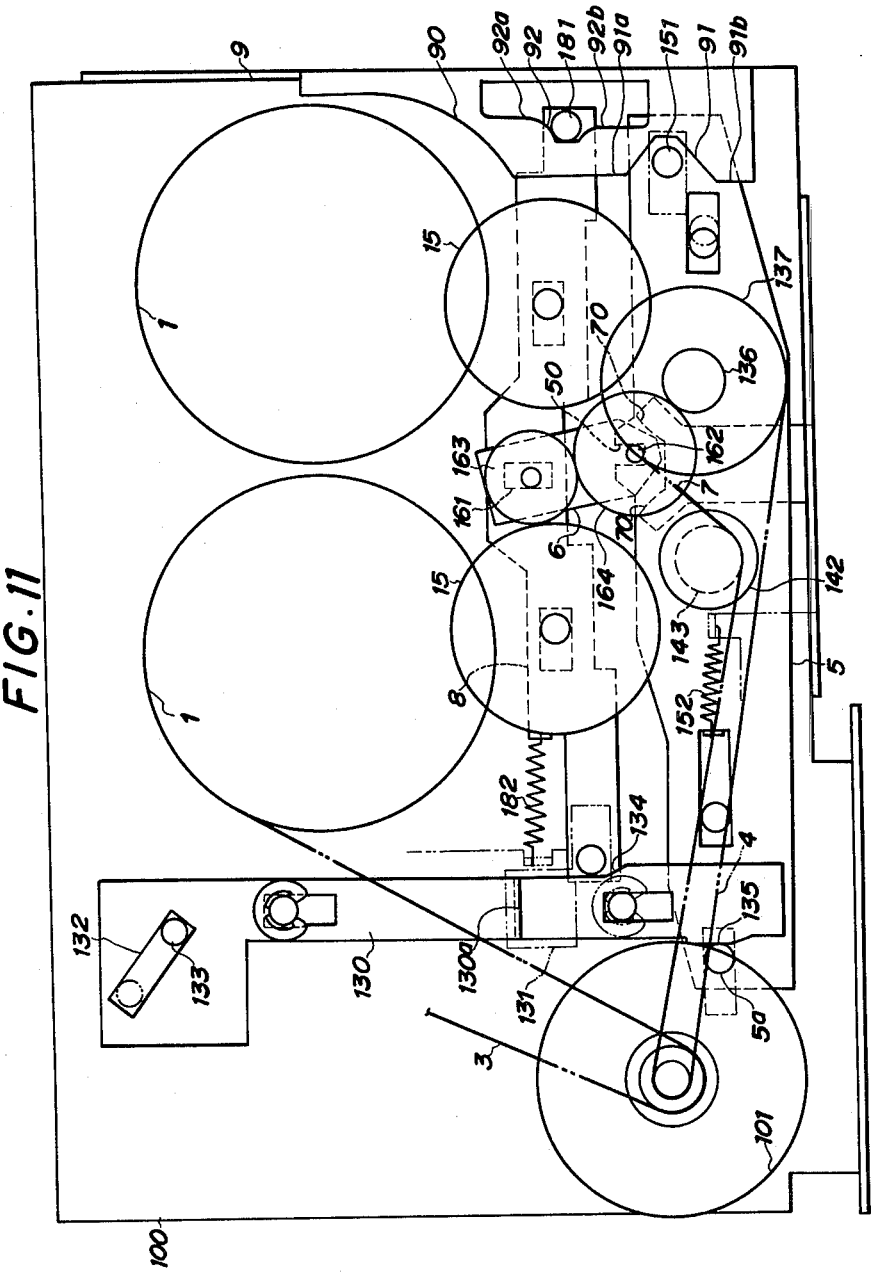

TAPE PLAYER

BACKGROUND OF THE INVENTION

This invention relates to a tape player art and more particularly to a tape player which can enjoy minimized wow and flutter as well as reduced thickness in construction.

The reduction in thickness of a tape player will not only contribute to reduction of materials to be used for manufacturing of the tape player but also enable the tape player to be suitably installed with advantage in a limited space for a driver's seat in a car. In conventional mobile tape players, it is general that wow and flutter is caused principally by a load fluctuation in the tape drive system. The conventional mobile tape players generally employ such a system that flywheels are driven by a belt wound around a motor reel. The reel driver is driven through a flywheel drive of a constant rate and a drive system is formed through a fast-forward/rewind mechanism, so that the drive load applied thereby fluctuates considerably and wow and flutter is inevitably caused. On the other hand, to establish such a reel driver-drive system, there should be employed such a structure that a gear or wheel is mounted coaxially with the flywheel and the drive system should be formed through the gear or wheel coaxial with the flywheel. Consequently, the flywheel assembly becomes inevitably bulky and thick. Furthermore, the flywheel is provided with a capstan and a tape pack mounted thereon, requiring a further mechanism for loading/unloading the tape pack thereon which unavoidably limits the desired reduction in thickness of the tape player.

SUMMARY OF THE INVENTION

The present invention has been made with the view of elimination of the disadvantages or defects of the conventional mobile tape player. First of all it has a structure such that two endless belts are wound around a motor shaft, with one arranged around flywheels having respective captans and another arranged around a reel shaft drive system. In this structure, a motor pulley is provided for mounting the belts with respect to the motor shaft. To mount two belts, two motor pulleys may be employed or one motor pulley having two receiving grooves may alternatively be employed. In the tape player of this type wherein a cassette type tape pack is usually employed, it is desirable to provide a fast-forward/rewind mode as well as a forward/reverse mode. To this end, one of the belts is wound around a forward/reverse feed gear together with a fast-forward/rewind drive gear, and these gears are disposed on a slidable plate which is adapted to be operated upon actuation of a selector plate provided on a housing to be described.

BRIEF DESCRIPTION OF THE DRAWINGS

FIG. 2 shows a belt arrangement with respect to a flywheel and a reel shaft drive system in the tape player shown in FIG. 1;

FIG. 3 is a side elevational view of the tape player shown in FIG. 1, illustrating a tiltable member and other members associated therewith in an ejected position;

FIG. 4 is a similar side elevational view of the tape player, illustrating the tiltable member and other members associated therewith in a position for playback operation;

FIG. 8 is an explanatory view showing the formation of fast-forward/rewind drive system in the tape player shown in FIG. 1;

FIG. 9 is a similar explanatory view showing the formation of forward/reverse drive system in the tape player shown in FIG. 1;

FIG. 10 is an explanatory view showing the tape player in a forward feed mode;

FIG. 11 is a similar explanatory view showing the tape player in a reverse feed mode;

FIG. 12 is a similar explanatory view showing the tape player in a fast-forward drive mode; and FIG. 13 is a similar explanatory view showing the tape player in a rewind drive mode.

DESCRIPTION OF THE PREFERRED EMBODIMENTS

Figure 1:
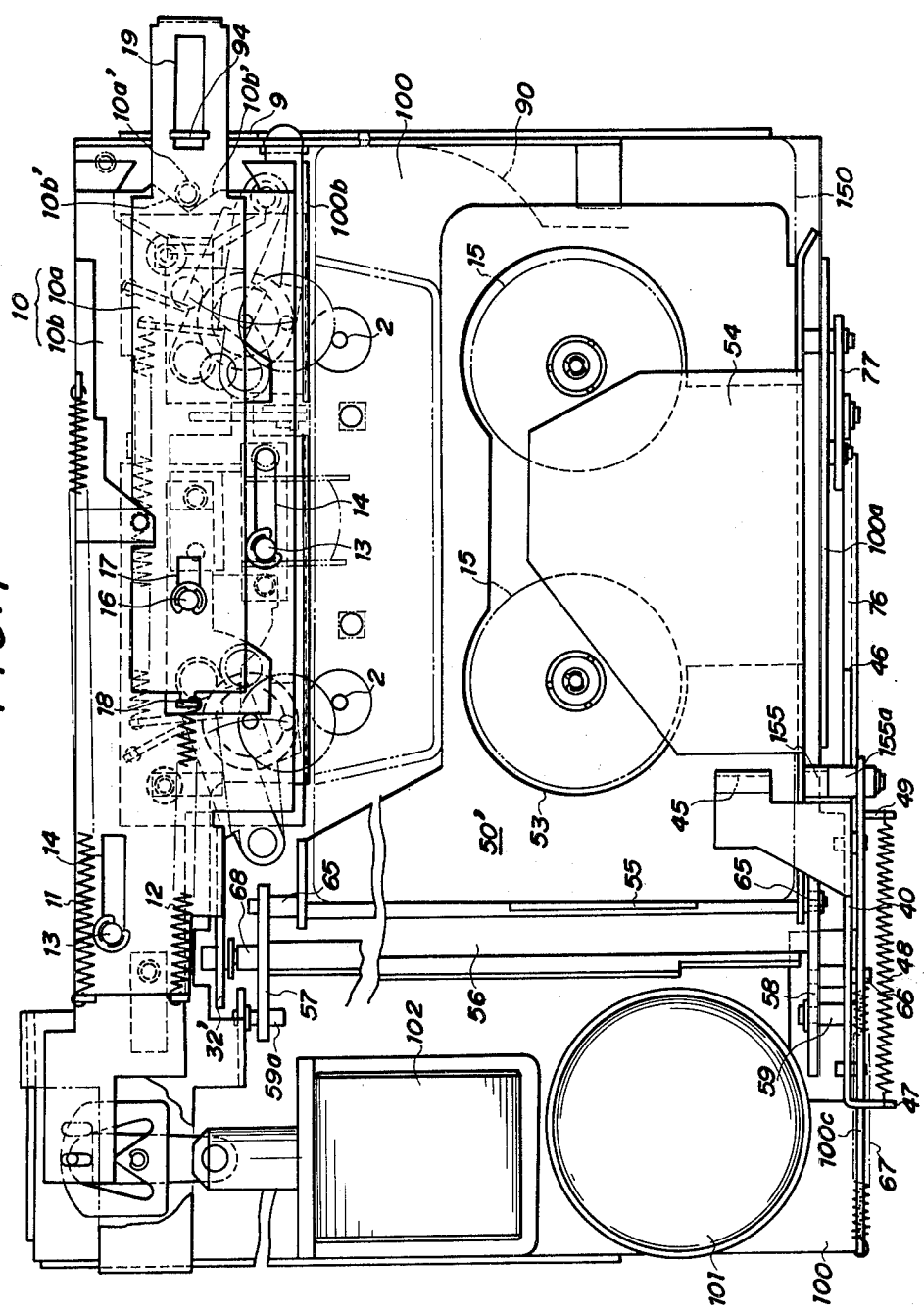
FIG. 1 is a plan view of one form of a tape player in accordance with the present invention.

Referring now to the drawings, there are illustrated preferred embodiments of the present invention. The showing therein is on an enlarged scale twice actual size for clarification. A housing 100 has an area for mounting or loading a cassette 150 as shown in dashed lines in FIG. 1. On the housing 100 are mounted a motor 101 and a plunger 102 connected to an ejecting lever 10. Capstans 2 2 are also provided on the housing in the cassette mounting area adjacent the ejecting lever 10 and disposed respectively at central positions of two flywheels 1—1 provided on a bottom plate of the housing 10 as shown in FIG. 2. The flywheels 1—1 are rotatably mounted by shafts between the bottom plate of the housing 100 and an auxiliary plate 105 spaced a certain distance from said bottom plate. A shaft of the motor 101 is provided with a motor pulley 104 having multi-stepped portion, namely, belt receiving portions 104a and 104b. Around the belt receiving portion 104a is wound a first endless belt 3 and around the belt receiving portion 104b is wound a second endless belt 4. The first belt 3 is further wound around the flywheels 1—1 through an intermediate pulley 30, and the second belt 4 is further wound around a pulley 33 of relatively large diameter which is formed integrally with a forward/reverse transport gear 32 and a pulley 43 of relatively small diameter adjacent said pulley 33 and formed integrally with a fast forward/rewind gear 42. The gears and pulleys as mentioned above are rotatably supported by supports 34, 44 provided on the housing 100, respectively. A slidable plate 5 is provided under the bottom plate of the housing 100 so as to slide right and left as viewed in FIG. 2. The slidable plate 5 has a forked operating portion 50 intermediate its longitudinal ends. The operating portion 50 is adapted to engage with a pin 62 provided at a tip end portion of a gear plate 6 which is adapted to slide through the engagement of a pin 60 provided at a base end portion of the gear plate 6 with an elongated slot 61. A control projection 7 provided on the housing is adapted to abut against said operating portion 50. The control projection 7 has oppositely laterally extending forked protrusions 70—70 which are spaced more than the protrusions of the operating portion 50 and disposed lower than said operating portion 50 so as to engage with the pin 62, enabling the gear plate 6 to slide along the elongated slot 61. A selector plate 9 is provided so as to slide with respect to the forward side of the housing 100. The selector plate 9 has an operating portion 90 bent along the bottom plate of the housing 100. The operating portion 90 has a first cam portion 91 formed on the edge of the operating portion 90 and a second cam portion 92 formed along the contour of a slot formed in the operating portion 90. These cam portions 91 and 92 are adapted to engage with a pin 51 provided on the slidable plate 5 and a pin 81 provided on another slidable plate 8 disposed in parallel with said slidable plate 5, respectively. Tension springs 52 and 82 are provided between the housing 100 and the plates 5 and 8, respectively to urge said pins 51 and 81 so as to engage with said cam portions 91 and 92, respectively. As depicted in the drawings, the operating portion 90 of the selector plate 9 has a pair of engaging portions 91a and 91b adjacent the cam portion 91 and a pair of engaging portions 92a and 92b adjacent the cam portion 92. The distance from the cam portion 92 is larger at the engaging portion 92a than at the engaging portion 92b. Similarly, the distance from the cam portion 91 is larger at 91b than at 91a. On the gear plate 6 are provided two interlocking gears 63 and 64. The gears 63 and 64 are adapted to switch the interlocking system between reel bases 15—15 and gears 32 and 42 by the switching control operation of the slidable plate 5 and the control projection 7 as mentioned above.

The slector plate 9 is adapted to be operated by an ejecting lever 10 in the present embodiment. To this end, the ejecting lever 10 is composed of a first lever 10a and a second lever 10b. A tension spring 11 is provided between the second lever 10b and the housing 100, and a tension spring 12 is provided between the first and second levers 10a and 10b. The second lever 10b is so formed that its elongated guide slots 14—14 receive therein fixed guide pins 13—13 for its sliding in the longitudinal direction, whereas the first lever 10a is so structured that its elongated slot 17 formed intermediate its longitudinal ends receives therein a fixed pin 16, the spring 12 is mounted on a hook 18 provided at its one end and its elongated slot 19 formed at its another end portion receives therein an engaging projection 94 formed on the selector plate 9 at its one side end. Stated illustratively, when the first lever 10a is pressed in its longitudinal direction, the second lever 10b is conjointly pressed in the same direction through a pin 10a' projected from the bottom of said first lever 10a, which carries out ejecting operation. On the other hand, when the base portion of the first lever 10a is depressed laterally (up and down as viewed in FIG. 1) while holding it by tip ends of fingers, the first lever 10a is rotated laterally around the fixed guide pin 16. This enables the selector plate 9 to be shifted. In the sliding of the selector plate 9, the pin 10a' is forced laterally from a side 10b' of a V-shaped notch of the second lever 10b, so that the second lever 10b is slightly pressed inwardly against the action of the spring 11.

In accordance with the embodiment of the present invention, since the two belts 3 and 4 are wound around the motor shaft with one belt 3 arranged around the flywheels 1, 1 having the capstans 2—2 and the other belt 4 arranged around the reel shaft, to wit, the reel base drive system, the flywheel drive system and the reel shaft drive system can be separately operated. Accordingly, the causes for wow and flutter such as load fluctuation involved in the conventional structure can be much eliminated, ensuring desired playback or record. Furthermore, the flywheel assembly, which should inevitably be bulky in the conventional technique, is much simplified in structure because in the present invention it is sufficient for the flywheel assembly to have a structure suitable for receiving the belts thereon and there is no need to provide pulleys or gears to be laid upon one another any more for providing a reel drive system. Thus, the thickness of the tape player can be much reduced at a portion related to the flywheels, permitting the corresponding reduction in the entire thickness of the tape player. This is especially desirable when the tape player is installed on a car.

In a tape player adapted to use a cassette for record and playback, especially a tape player of the type intended to be mounted on a car, it is necessary to move a cassette inserted from the front of the player to a given playback position for playback/record operation and to remove the cassette from the playback position by ejection for performing desired exchange of cassettes. However, a mechanism heretofore employed for loading/unloading of cassettes is relatively complicated in structure and operation, and the tape player is formed inevitably bulky, especially in thickness. In addition, the conventional cassette type tape player has a further defect and disadvantage such that the cassette placed in the playback position is not always kept stable.

Figure 5:
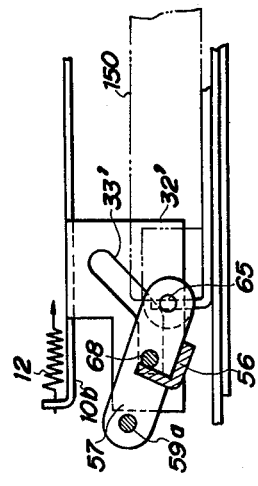
FIG. 5 is a side elevational view of the tiltable member, illustrating one link component and ejecting lever operating component in an ejected position.
Figure 6:
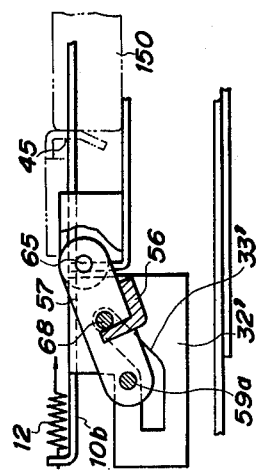
FIG. 6 is a similar side elevational view of the tiltable member, illustrating its link component and ejecting lever operating component in a position for playback operation.

In accordance with another embodiment of the present invention, there is further provided a tape player which is free from these disadvantages and defects of the conventional tape player. As shown in FIGS. 3 to 7, the tape player of this embodiment is so constructed that a cassette receiving frame is supported at its one side by a tiltable member having a link portion and an L-shaped link portion formed integrally therewith, said L-shaped link portion is coupled by a connecting rod with another L-shaped interlocking link provided on a housing which is adapted to support another side of the cassette receiving frame, said link portion has an engaging member engageable with a dog-legged guide slot formed in an ejecting lever, and a guide shaft for a head plate received in the cassette receiving frame and provided at the side of a cassette loading area is adapted to abut against a cam portion formed on the ejecting lever. As can be seen from the figures, a housing 100 has, at its one side, upright portions 100a and 100c and, at its another side, an ejecting lever setting table 100b having a suitable height. The housing 100 further has a loading area for a cassette 150. On the housing are provided a motor 101 and a plunger 102 at its forward portion. An ejecting lever 10 is provided on the ejecting lever setting table 100b. At a side portion of the front portion of the cassette loading area, a passive member 40 is slidably mounted through pins 40a and 40b formed on the upright portion 100c and received in elongated guide slots 40c and 40d formed in said passive member 40, respectively. A tension spring 48 is provided between a spring seat 47 formed at a tip end of the passive member 40 and a spring seat 49 formed on the upright portion 100c so as to urge the passive member 40 in a direction for pulling out the member 40 into the cassette loading area. The passive member 40 has a passive portion 45 bent downwardly as depicted in FIGS. 4 and 5 and adapted to be depressed by the end of the cassette 150 loaded in place. The passive member 40 further has a stepped portion 46 at its forward end portion. In a state for ejection as shown in FIGS. 1 and 3, an engaging pin 155 provided at a tip end portion of a cassette receiving frame 50' is positioned on the stepped portion 46. In the embodiment as shown, a roller 155a is provided to the engaging pin 155 so as to smoothly rollingly slide on the stepped portion 46. The cassette receiving frame 50' has one side upright to form a cassette holding portion 54 extending over the cassette loading area and assumes a sideways U-shape when viewed front ways. The base end of the cassette receiving frame 50' is pivotally connected by pins 65—65 to tip ends of link portions 57 and 58 provided on both ends of a tiltable member 56. The link portion 57 is formed in a simple link shape as shown in FIGS. 5 and 6, while the link 58 is formed in an L-shape. The link portions 57 and 58 are connected to the housing at the base end and corner portion by shafts 59a and 59, respectively. An engaging member 68 is provided intermediate the ends of the link portion 57 and engaged with a dog-legged guide slot 33' formed in an operating portion 32' bent downwardly from the ejecting lever 10 (more specifically a second lever 10b as mentioned in detail hereinafter) at its inner position. The L-shaped link portion 58 has a projection 66 at its lower end and a tension spring 67 is provided between the projection 66 and the housing 100. The lower end of the L-shaped link portion 58 is connected to one end of a rod 76, another end of which is in turn connected by a pin 75 to another L-shaped interlocking link 77 pivotally connected by a pin 78 to the upright portion 100a. Another end of the L-shaped interlocking link 77 is connected to a shaft 79 provided on the cassette receiving frame 50' at its forward end portion. Thus, in response to the movement of the L-shaped link portion 58, the L-shaped interlocking link 77 is actuated to raise or lower the cassette receiving frame 50' keeping it horizontal.

Capstans 2—2 are provided in the cassette loading area at a position adjacent the ejecting lever setting table 100b, and rotated at a constant speed in a conventional manner by flywheels 1—1 which are in turn driven by a belt wound around a motor pulley of the motor 101. In an opening portion 53 of the cassette receiving frame 50' are provided reel bases 15, 15. The ejecting lever 10 for ejecting the cassette 150 loaded on the capstans 2—2 and the reel bases 15, 15 includes a first lever 10a and a second lever 10b. A tension spring 11 is provided between the second lever 10b and the ejecting lever setting table 100b, and a tension spring 12 is provided between the first and second levers 10a and 10b. The second lever 10b is adapted to slide in its longitudinal direction through the engagement of its elongated guide slots 14—14 with fixed pins 13—13. The first lever 10a has a construction such that its elongated slot 17 formed intermediate its longitudinal ends receives therein a fixed pin 16, the spring 12 is mounted on a hook 18 provided at its one end, and its elongated slot 19 formed at its another end portion receives therein an engaging projection 94 formed on a selector plate 9 at its one side end. Stated illustratively, when the first lever 10a is pressed in its longitudinal direction, the second lever 10b is conjointly pressed in the same direction through an engaging pin 10a' projected from the bottom of said first lever 10a, which carries out ejecting operation. On the other hand, when the base portion of the first lever 10a is pressed laterally (up and down as viewed in FIG. 1) while holding it by tip ends of fingers, the first lever 10a is rotated laterally around the fixed guide pin 16. This enables the selector plate 9 to be slided. Upon sliding of the selector plate 9, the pin 10a' is forced laterally from a side 10b' of a V-shaped notch of the second lever 10b, so that the second lever 10b is slightly pressed inwardly against the action of the spring 11. In the present embodiment, as the operating portion 32 is formed on the second lever 10b as specified above, the pin 68 located at the inner position of the dog-legged guide slot 33 as shown in FIG. 6 is moved to a forward position of the slot 33 as shown in FIG. 5 by such ejecting operation as by pushing both the levers 10a and 10b conjointly. This causes the link portion 57 to be tilted upwardly and restore the cassette receiving frame 50' from the playback position of FIG. 4 to its original loading/unloading position as shown in FIG. 3. A head plate 81' is provided under the ejecting lever setting table 100b disposed adjacent- ly to cassette loading/unloading area so as to slide by means of guide pins 82'-82' provided on the housing 100 and elongated slots. A guide shaft is adapted to abut on a guide groove formed in the table 100b and a cam portion of the second lever 10b. The first lever 10a has an engaging portion recessed at a position corresponding to the concaved portion of the cam portion. The head plate 81' is provided with a head. A pinch roller frame including a pinch roller is attached directly to the housing 100 by a pin to the housing 100, and springs are mounted between a spring mounting portion of said pinch roller frame and said guide shaft to urge said pinch roller forwardly. The pinch roller frame is provided, at its tip end, an upwardly projecting engaging member, which is so disposed as to abut against cam portions of a forward/ reverse feed selector plate provided on the ejecting lever setting table 100b when the cassette is loaded into a playback position. In this state, upon switching of the forward/ reverse feed selector plate, one of the pinch rollers in the pinch roller frame is pressed against the capstn to pinch a tape of the cassette 150 between the capstan 2 and the pinch roller for feeding the tape. As is conventional, the tape feed direction is changed between forward and reverse through the change in the connecting relation to the pinch rollers. The forward-/reverse feed selector plate is inserted between the second lever 10b and the setting table 100b and operated for switching by the operation of the electromagnetic plunger 102. A pin provided on an operating portion of the forward/ reverse feed selector plate acts alteratingly on cam groove portions of cam plate pivotally supported on the setting table 100b, and an engaging member provided on the cam plate at a position forward than the pivotal point actuates the selector plate to shift the same right and left as viewed in FIG. 1 for switching of the feed direction.

Figure 7:
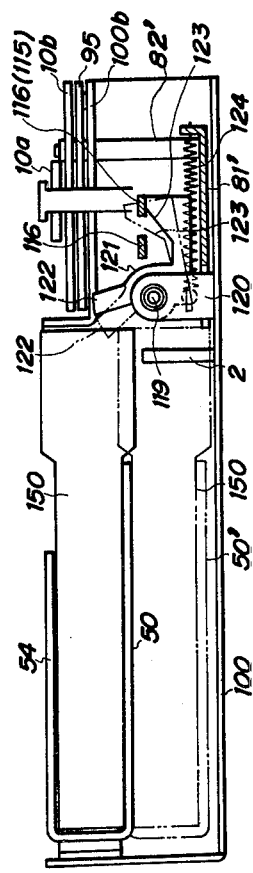
FIG. 7 is a side elevational view of a head plate and holding lever of the tape player shown in FIG. 1.

On one side of the head, a support seat 120 is provided to the housing 100 as shown in FIG. 7. The support seat 120 is provided with a holding lever 121 for holding the cassette loaded which is pivotally supported at 119. The holding lever 121 is formed with a holding projection 122 at its tip end and a restriction portion 123 at its tail portion. On the other hand, a lock member 115 having a projection 116 bent upwardly, rising and protruded on the side of the head is fixed to the head plate 81'. The projection 116 of the lock member 115 is adapted to abut against said restriction portion 123. A tension spring 124 is provided between the lower portion of the holding lever 121 and the head plate 81'. This spring 124 acts to urge the head plate 81' towards the cassette loading area. At the same time, when the head plate 81' assumes the position as shown by a solid line in FIG. 7, to wit, the outwardly drawn position (accordingly, the head is in the retired position) as the second lever 10b is depressed together with the first lever 10a, forcing the guide shaft outwardly by the cam portion 86, the projection 116 of the lock member 115 acts on the restriction portion 123 to keep the holding projection 122 in its upright position as shown by a solid line. Then, the cassette 150 is loaded into the playback position and the head plate 81' is advanced towards the cassette 150 loaded, the projection 116 is released from the engagement with the restriction portion 123. Consequently, the projection 122 is inclined to a position as shown in a broken line to press and hold the upper corner 150a of the cassette 150 loaded in place. As the cassette 150 is pressedly held with respect to the upper corner 150a, the cassette 150 is depressed towards the interior and bottom of the receiving frame 50'. This serves to retain the cassette loaded in the playback position in its guided position and permits the tape player to be mounted with advantages on a car which should be subjected to perpetual vibration.

In the thus constructed tape player in accordance with the present invention, it will be seen that when the cassette 150 is loaded with respect to the cassette receiving frame 50', the forward end of the cassette 150 pushes the passive member 40 to disengage the pin 155 from the stepped portion 46, accordingly rotate the L-shaped link portion 58 from the position of FIG. 3 to the position of FIG. 4 by the action of the spring 67 and lower not only the forward portion of the receiving frame 50 in cooperation with the link portion 57 but also the rear portion thereof through the connecting rod 76. Thus, the cassette 150 is loaded in a playback position keeping a horizontal state. Furthermore, the rotation of the link portion 57 from the position of FIG. 5 to the position of FIG. 6 will return the second and first levers 10b and 10a of the ejecting lever 10, substantially conjointly, to their original positions by the action of the spring 12. Upon the restoration of the ejecting lever 10, the guide shaft of the head plate 81' is fitted into the cam portion as shown in FIG. 1 and the head plate 81' is advanced until the guide shaft enters the interior of the cam portion by the action of the springs to put the player into a playback mode. On the other hand, when the ejecting lever 10 is pressed from such a playback position, the guide shaft is forced out by means of the cam portion of the second lever 10b to retire the head plate 81' from the cassette and the operating portion 32' of the second lever 10b is advanced to raise the engaging member 68 in the position of FIG. 6 by means of the dog-legged slot 33' and to rotate the link portions 57 and 58 counterclockwise, restoring them into the position of FIG. 5. Thus, the cassette receiving frame 50' is raised from the position of FIG. 4 to the position of FIG. 3 to provide an ejection state. The cassette 150 can then be removed in the forward direction by the action of the passive member 40 restored by the action of the spring 48.

In accordance with the embodiment of the present invention, the cassette receiving frame 50' can be horizontally raised or lowered between the ejection position and the playback position. To achieve this operation is employed the tiltable member 56 which is so constructed that the link portions 57 and 58 are formed integrally by bending at the sides thereof, for simplification of the structure. Further, the engaging member 68 provided on one of the link portions is engaged with the dog-legged slot 33' of the operating portion 32' formed on the ejecting lever, so that the operation of the tiltable member 56 is rendered cooperative with the operation of the ejecting mechanism, and the construction for the interlocking mechanism can be simplified. Furthermore, the guide shaft provided on the head plate is brought into abutment against the cam portion formed on the ejecting lever, so that the head plate can be moved smoothly with respect to the cassette loaded in the playback position. Thus, this embodiment enables smooth and accurate playback or record with a relatively simplified and thinned mechamism, providing a remarkable industrial effect.

In one practical form of the tape player in accordance with the embodiment of the present invention, the pinch roller holding frame including pinch rollers is pivotally connected to the housing and adapted to be operated by the forward/reverse selector plate disposed on the ejecting lever setting table. Accordingly, the tape feed operation is free from the influence by the movement of the head plate and can be more stable as compared with that of the conventional technique. In addition, since the forward/reverse selector mechanism is also provided on the setting table, the tape player can be further rendered thinner.

Since the tape player of the present invention has further specific construction such that the holding lever 121 is pivotally connected to the pivotal support member provided on the housing, the spring 124 is provided between the holding lever and the head plate 81', and the restriction portion 123 of the holding lever 121 is adapted to be engaged with or disengaged from the lock member provided on the head plate. Consequently, in the playback position where the head plate is in its advanced position with respect to the cassette set in place for playback, the cassette is held stably by the holding projection 122 of the holding lever 121, and when the head plate is in its retired position, the holding of the cassette is completely released to permit smooth loading or unloading of the cassette.

In a tape player, especially of a type where a cassette type tape cartridge (hereinafter referred to as cassette) is employed, it is required, because of its two-reel system, to switch the tape feed direction between forward and reverse and it is also important to provide fast-forward and rewind modes. Heretofore, some tape players which can attain these modes have been provided. However, all of these conventional tape players have separate selector mechanisms for forward/reverse tape feed and for fast-forward/rewind drive. This may be natural in view that the two selector operations are quite different from each other, but the provision of two separate operation mechanisms leads to complication in structure, requiring increased number of components and increased thickness for housing the mechanism. In this connection, it is to be noted that when the tape player is mounted on a car, it is desirable that the tape player be thin and compact as mentioned before for the reason that there is only restricted space in a car for mounting the player. Thus, in this respect, the conventional tape player is not always satisfactory.

In another embodiment of the present invention, there is provided a tape player which is free from the disadvantage or defect of the conventional ones. In the tape player of this embodiment, the selector mechanism for forward/reverse tape feed and the selector mechanism for fast-forward/rewind drive are made common in their principal portions so that the relevant construction may be much simplified and rendered compact, reducing the thickness of the tape player.

In the embodiment as shown in FIGS. 8 to 13, a housing 100 has, at its one side, upright portions 100a and 100c and, at its another side, an eject lever setting table 100b having a suitable height. The housing 100 further has a loading area for a cassette 150. On the housing are provided a motor 101 and a plunger 102 at its forward portion. An ejecting lever 10 is provided on the ejecting lever setting table 100b. At a side portion of the front portion of the cassette loading area, a passive member 40 is slidably mounted through pins 40a and 40b formed on the upright portion 100c and received in elongated guide slots 40c and 40d formed in said passive member 40, respectively. A tension spring 48 is provided between a spring seat 47 formed at a tip end of the passive member 40 and a spring seat 49 formed on the upright portion 100c so as to urge the passive member 40 in a direction for pulling out the member 40 into the cassette loading area. The passive member 40 has a passive portion 45 bent downwardly as depicted in FIGS. 12 and 13 and adapted to be depressed by the forward end of the cassette 150 loaded in place. The passive member 40 further has a stepped portion 46 at its forward end portion. In a state for ejection as shown in FIGS. 1 and 3, an engaging pin 155 provided at a tip end portion of a cassette receiving frame 50' is positioned on the stepped portion 46. In the embodiment as shown, a roller 155a is provided to the engaging pin 155 so as to smoothly rollingly slide on the stepped portion 46. The cassette receiving frame 50' has one side upright to form a cassette holding portion 541 extending over the cassette loading area and assumes a sideways U-shape when viewed front ways. The base end of the cassette receiving frame 50' is pivotally connected by pins 65, 65 to tip ends of link portions 57, 58 provided on both ends of a tiltable member 56. The link portion 57 is formed in a simple link shape as shown in FIGS. 5 and 6, while the link 58 is formed in an L-shape. The link portions 57 and 58 are connected to the housing 100 at their base end and corner portion by shafts 59a and 59, respectively. An engaging member 68 is provided intermediate the ends of the link portion 57 and engaged with a dog-legged guide slot 33' formed in an operating portion 32' bent downwardly from the ejecting lever 10 (more specifically a second lever 10b as mentioned in detail hereinafter) at its inner position. The L-shaped link portion 58 has a projection 66 at its lower end and a tension spring 67 is provided between the projection 66 and the housing 100. The lower end of the L-shaped link portion 58 is connected to one end of a rod 76, another end of which is in turn connected by a pin 75 to another L-shaped interlocking link 77 pivotally connected by a pin 78 to the upright portion 100a. Another end of the L-shaped interlocking link 77 is connected to a shaft 79 provided on the cassette receiving frame 50' at its forward end portion. Thus, in response to the movement of the L-shaped link portion 58, the L-shaped interlocking link 77 is actuated to raise or lower the cassette receiving frame 50 keeping it horizontal.

Capstans 2—2 are provided in the cassette loading area at a position adjacent the ejecting lever setting table 100b, and rotated at a constant speed in a conventional manner by flywheels 1—1 which are in turn driven by a belt would around a motor pulley of the motor 101. In an opening portion 53 of the cassette receiving frame 50' are provided reel bases 15—15. The ejecting lever 10 for ejecting the cassette 150 loaded on the capstans 2—2 and the reel bases 15—15 includes a first lever 10a and a second lever 10b. A tension spring 11 is provided between the second lever 10b and the ejecting lever setting table 100b, and a tension spring 12 is provided between the first and second levers 10a and 10b. The second lever 10b is adapted to slide in its longitudinal direction through the engagement of its elongated guide slots 14—14 with fixed pins 13—13. The first lever 10a has a construction such that its elongated slot 17 formed intermediate its longitudinal ends receives therein a fixed pin 16, the spring 12 is mounted on a hook 18 provided at its one end, and its elongated slot 19 formed at its another end portion receives therein an engaging projection 94 formed on a selector plate 9 at its one side end. Stated illustratively, when the first lever 10a is pressed in its longitudinal direction, the second lever 10b is conjointly pressed in the same direction through an engaging pin 10a' projected from the bottom of said first lever 10a, which carries out ejecting operation. On the other hand, when the base portion of the first lever 10a is depressed in a direction of an arrow mark as shown in FIG. 8 while holding it by tip ends of fingers, the first lever 10a is rotated laterally around the fixed guide pin 16. This enables the selector plate 9 to be slided. Upon sliding of the selector plate 9, the pin 10a' is forced laterally from a side 10b' of a V-shaped notch of the second lever 10b, so that the second lever 10b is slightly pressed inwardly against the action of the spring 11. In the present invention, as the operating portion 32 is formed on the second lever 10b as specified above, the pin 68 located at the inner position of the dog-legged guide slot 33 is moved to a forward position of the slot 33 by such ejecting operation as by pushing both the levers 10a and 10b conjointly. This causes the link portion 57 to be tilted upwardly and restore the cassette receiving frame 50' from the playback position of FIG. 4 to its original loading/unloading position as shown in FIG. 9. A head plate 81' is provided under the ejecting lever table 100b disposed adjacently to the cassette loading/unloading area so as to slide by means of guide pins 82'—82' provided on the housing 100 and elongated slots. A guide shaft is adapted to abut on a guide groove formed in the table 100b and a cam portion of the second lever 10b. The first lever 10a has an engaging portion recessed at a position corresponding to the concaved portion of the cam portion. The head plate 81' is provided with a head. A pinch roller frame including a pinch roller is attached directly to the housing 100 by a pin to the housing 100, and springs are mounted between a spring mounting portion of said pinch roller frame and said guide shaft to urge said pinch roller forwardly. The pinch roller frame is provided, at its tip end, an upwardly projecting engaging member, which is so disposed as to abut against cam portions of a forward/reverse feed selector plate provided on the ejecting lever setting table 100b when the cassette is loaded into a playback position. In this state, upon switching of the forward/reverse feed selector plate, any of the pinch rollers in the pinch roller frame is pressed against the capstan to pinch a tape of the cassette 150 between the capstan 2 and the pinch roller for feeding the tape. As is conventional, the tape feed direction is changed between forward and reverse through the change in the connecting relation to the pinch rollers. In this embodiment of the present invention, an interlocking plate 130 as shown in FIGS. 8 to 13 is disposed on the housing 100. Stated illustratively, the interlocking plate 130 has a bent portion 130a and mounted through an opening 131 of the housing 100. One half of the interlocking plate 130 is positioned on the upper face of the housing 100 and another half is slidably attached on the lower face of the housing. A diagonal guide slot 132 formed at one end portion of the interlocking plate 130 is adapted to receive an engaging pin 133 projected one the lower face of the forward-/reverse feed selector plate 91' so that in response to the sliding operation of the forward/reverse feed selector plate, the interlocking plate 130 is caused to slide right and left. The interlocking plate 130 has a tip end formed at its one side with a first cam 134 and at its another side with a second cam 135 as depicted in the figures. Against the first cam 134 abuts one end of a slidable plate 8 which is mounted on the housing 100 so as to slide on the lower face thereof and urged to slide towards the interlocking plate 130 by a spring 132. Against the second cam 135 abuts an engaging member 5a provided at one end of a slidable plate 5 which is urged in the opposite direction by means of a spring 152. Accordingly, in response to the sliding operation of the interlocking plate 130, each of the slidable plates 5 and 8 is caused to slide by a distance corresponding to the length of the respective cam followed.

A motor shaft of the motor 101 has a motor pulley 104 with a multi-step belt receiver 104a104b. A first belt 3 is wound around the belt receiving portion 104a and a second belt 4 is would around the belt receiving portion 104b. The first belt 3 is further would around the flywheels 1—1 via an intermediate pulley 30. The second belt 4 is further wound around a pulley 137 of relatively large diameter formed integrally with a forward/reverse feed gear 136 and a pulley 143 of relatively small diameter formed integrally with fast-forward/rewind drive gear 142 and adjacent said gear 136. These gears and pulleys are rotatably supported by supports 138 and 144. The slidable plate 5 is provided under the bottom plate of the housing 100 so as to slide right and left. The slidable plate 5 has a forked operating portion 50 intermediate its longitudinal ends. The operating portion 50 is adapted to engage with a pin 162 provided at a tip end portion of a gear plate 6 which is adapted to slide through the engagement of a pin 160 provided at a base end portion of the gear plate 6 with an elongated slot 161. A control projection 7 provided on the housing is adapted to abut against said operating portion 50. The control projection 7 has oppositely laterally extending forked protrusions 70—70 which are spaced more than the protrusions of the operating portion 50 and disposed lower than said operating portion 50 so as to engage with the pin 162, enabling the gear plate 6 to slide along the elongated slot 161. A selector plate 9 is provided so as to slide with respect to the forward side of the housing 100. The selector plate 9 has an operating portion 90 bent along the bottom face of the housing 100. The operating portion 90 has a first cam portion 91 formed on the edge of the operating portion 90 and a second cam portion 92 formed along the contour of a slot formed in the operating portion 90. These cam portions 91 and 92 are adapted to engage with a pin 151 provided on the slidable plate 5 and a pin 181 provided on another slidable plate 8 disposed in parallel with said slidable plate 5, respectively. Tension springs 152, and 182 are provided between the housing 100 and the plates 5 and 8, respectively to urge said pins 151 and 181 so as to engage with said cam portions 91 and 92, respectively. As depicted in the drawings, the operating portion 90 of the selector plate 9 has a pair of engaging portions 91a and 91b adjacent the cam portion 91 and a pair of engaging portions 92a and 92b adjacent the cam portion 92. The distance from the cam portion 92 is larger at the engaging portion 92a than at the engaging portion 92b. Similarly, the distance from the cam portion 91 is larger at 91b than at 91a. On the gear plate 6 are provided two interlocking gears 163 and 164. The gears 163 and 164 are adapted to switch the interlocking system between reel bases 15, 15 and gears 136 and 142 by the switching control operation of the slidable plate 5 and the control projection 7.

The selector plate 9 is adapted to be operated by an ejecting lever 10 in the present embodiment. To this end, the ejecting lever 10 is composed of a first lever 10a and a second lever 10b. A tension spring 11 is provided between the second lever 10b and the housing 100, and a tension spring 12 is provided between the first and second levers 10a and 10b. The second lever 10b is so formed that its elongated guide slots 14—14 receives therein fixed guide pins 13—13 for its sliding in the longitudinal direction, whereas the first lever 10a is so structured that its elongated slot 17 formed intermediate its longitudinal ends receives therein a fixed pin 16 and its elongated slot 19 formed at its another end portion receives therein an engaging projection 94 formed on the selector plate 9 at its one side end. Stated illustratively, when the first lever 10a is pressed in its longitudinal direction, the second lever 10b is conjointly pressed in the same direction through a pin 10a' projected from the bottom of said first lever 10a, which in turn carries out ejecting operation. On the other hand, when the base portion of the first lever 10a is depressed laterally as shown in FIG. 8 (up and down as viewed in FIG. 1) while holding it by tip ends of fingers, the first lever 10a is rotated laterally around fixed guide pin 16. This enables the selector plate 9 to be shifted. In the sliding of the selector plate 9, the pin 10a' is forced laterally from a side 10b' of a V-shaped notch of the second lever 10b, so that the second lever 10b is slightly pressed inwardly against the action of the spring 11.

The forward/reverse feed selector plate is inserted between the second lever 10b and the setting table 100b and operated for switching by the operation of the electromagnetic plunger 102. A pin provided on an operating portion of the forward/reverse feed selector plate acts alteratingly on cam groove portions of cam plate pivotally supported on the setting table 100b and an engaging member provided on the cam plate at a position foward than the pivotal point actuates the selector plate to shift the same right and left as viewed in figures for achievement of the feeding direction switching.

The operation of the thus formed tape player in accordance with this embodiment is now explained. FIG. 8 shows an operational relation to switch into a fast-forward/rewind mode. When the first lever 10a is rotated to the left (downwardly as viewed in FIG. 8), there is formed a drive system as shown by thick solid lines, whereas when the lever 10a is rotated to the right, there is formed a drive system as shown by thick broken lines. These drive systems will be explained in detail later referring to FIGS. 12 and 13. FIG. 9 shows an operational relation for switching into a forward/reverse mode. When the forward/reverse feed selector plate is pulled out and its engaging pin 133 is located at the inner end of the diagonal guide slot 132, there is formed a drive system as shown by thick solid lines in FIG. 9, whereas when the selector plate is pushed forwardly to locate the engaging pin 133 at the outer end of the guide slot 132, there is formed a drive system as shown by thick broken lines in FIG. 9.

The operational states as given in FIG. 9 are more illustratively shown in FIGS. 10 and 11. In a forward feed mode with a drive system as shown by thick solid lines in FIG. 9, the interlocking plate 130 is caused to slide in an arrow direction, which in turn shift the slidable plates 5 and 8 in the directions of arrows, respectively. Consequently, the gear 163 is brought into engagement with a gear of the left reel base 15 to transmit the driving force by the belt 4 to said reel base 15, while the gear 164 is disengaged from the right reel base 15. This state is of a reference mode. In a reverse feed mode as shown in FIG. 11, when an ejecting operation is carried out by pushing the ejecting lever 10 inwardly, the engaging pin 10a' of the first lever 10a will push the tail of the forward/reverse feed selector plate to advance the engaging pin 133 (in case the player is originally in its forward feed mode, the engaging pin 133 is already in its advanced position and does no advance any more). Accordingly, after every completion of the ejecting operation, there is formed the forward feed mode. Thus, the tape player of this embodiment provides a unidirectional start, namely, forward start.

When the tape feed is thus started and the tape end is detected to generate a signal, the electromagnetic plunger 102 is actuated by the signal to achieve the switching operation through the switching cam. The tape player is then put in the reverse feed mode as shown in FIG. 11. State illustratively, in the state as shown in FIG. 11, both the slidable plates 5 and 8 are moved in the arrow directions upon the shifting of the interlocking plate 130 in the arrow direction. Accordingly, the gear 163 is disposed at a neutral position with respect to the reel bases 15, 15. Further, the tip end of the gear plate 6 is forced out by the control projection 7 so that the gear 164 is brought into contact with the gear of the right reel base 15. This operational relation is assured by the spring 6a provided between the gear plate 6 and the slidable plate 5. This state constitute a reverse feed mode.

The operational relation achieved by the actuation of the first lever 10a through the selector plate 9 for a fast-forward/rewind mode is shown in FIGS. 12 and 13. In a fast-forward mode as shown in FIG. 12, the selector plate 9 is moved in the arrow direction, so that the pin 181 is caused to slightly move to the right and the pin 151 is caused to considerably move to the left. The gear 163 is put in a free position and the gear 164 is engaged with the left reel base 15. The sliding distance of the slidable plate 5 is larger than that attained for switching the reference mode to a rewind mode as will be mentioned later. This enables the gear 164 to be put into an engaging position. The sliding distance of the slidable plate 8 is so determined as to put the gear 163 into a neutral position.

The rewind mode is shown in FIG. 13. The selector plate 9 is caused to slide in a direction opposite to that in the fast-forward mode, so that both the slidable plates 5 and 8 move in the arrow directions. The directions of the movements of the plates 5 and 8 are the same as those in FIG. 12, but the sliding distances are different due to the respective cam portions 91 and 92. Accordingly, the gear 163 is brought into contact with the right reel base 15 to drive it and the intermediate gear 164 is brought into engagement with the gear 143 since the distance the gear 164 moves to the left is less than that in the fast-forward mode. Thus, the rewind mode is formed.

According to the embodiment of the present invention, the intermediate gear disposed between the reel bases and between the forward/reverse feed gear and the fast-forward/rewind gear is switched by the slidable plates disposed between the interlocking plate for forward/reverse feed and the selector plate for fast-forward/rewind drive and the control projection, to provide suitable selection between the forward, reverse, fast-forward and rewind modes. This enables the structure of the related portions to be simplified and the mechanism to be rendered compact and thinner. Thus, the present invention provides a useful tape player of the type.

Furthermore, in the embodiment in which the fast-forward/rewind selector plate attached to the housing is operated for switching by means of the ejecting lever, the ejection operating portion and the fast-forward/rewind operating portion may be formed in one. This enables further simplification of the operating portion provided with the pushbuttons or knobs, and accordingly simplification of the structure and thinner formation of the tape player.

In addition, this embodiment in which the forward/reverse feed selector plate is reset into the forward mode whenever the ejection operation is completed by the ejecting lever, ensures correct performance of tape player in use.

What is claimed is:

1. A tape player comprising a motor, first and second endless belts, capstans, flywheels adapted to be rotated conjunctly with the capstans, two reels on which a tape cassette is to be loaded for record or playback, and two drive members adapted to be selectively coupled with a shaft of one or the other of said reels to take up a tape in said cassette, said first and second endless belts having portions coupled to the shaft of said motor, said first endless belt having portions engaging said drive members, said second endless belt having a portion engaging said flywheels, a forward/reverse feed gear coupled with one of said drive members, a fast feed and rewind gear coupled with the other drive member, a selector member, a slidable member adapted to slide in response to the operation of the selector member, an interlocking gear mechanism provided on said gear member, reel bases, reel actuators provided to the reel bases, and an interlocking member provided between said forward/reverse feed gear and said rewind gear and between said reel bases, said gear member being adapted to be switched by said operating portion, and said interlocking member being adapted to carry out the switching of the relation between said gears and said reel actuators.

2. A tape player comprising a motor, first and second endless belts, capstans, flywheels adapted to be rotated conjointly with the capstans, two reels on which a tape cassette is to be loaded for record or playback, and two drive members adapted to be selectively coupled with a shaft of one or the other of said reels to take up a tape in said cassette, said first and second endless belts having portions coupled to the shaft of said motor, said first endless belt having portions engaging said drive members, said second endless belt having a portion engaging said flywheels, a cassette receiving frame, a first link member, an L-shaped link member, a tiltable member adapted to support said first link member and said L-shaped link member at one end portion of said cassette receiving frame, an L-shaped interlocking link member, a connecting rod for connecting said L-shaped interlocking link member and said L-shaped link member, an engaging member provided on said first link member, an ejecting lever, a dog-legged guide slot formed on said ejecting lever, a heat member with a head mounted thereon, a guide shaft received in said cassette receiving frame and provided adjacently to a cassette loading area for guiding said head member, and a cam portion formed on said ejecting lever, said L-shaped interlocking link being adapted to support another end portion of said cassette receiving frame, said engaging member being engagable with said dog-legged slot, and said guide shaft being associated with said cam portion.

3. A tape player as set forth in claim 2, which further comprises a pivotally supported pinch roller holding frame, an engaging member provided on said pinch roller holding frame, an ejecting lever setting table, a forward/reverse feed selector member disposed on said setting table, and a cam portion formed on said selector member, said cam portion being engaged with said engaging member.

4. A tape player as set forth in claim 2, which further comprises a support seat, a holding lever secured to said support seat, a spring mounted between said holding lever and said head member, a lock member provided on the head member, a restriction portion formed on said holding lever, and a holding projection formed on said holding lever, said lock member being associated with said restriction portion, said holding projection being adapted to hold a cassette when the cassette is loaded into a playback position and the head member is in an advanced position, and said restriction portion being locked by said lock member when the head member is retired for ejection of the cassette, to release the holding of the cassette.

5. A tape player comprising a motor, first and second endless belts, capstans, flywheels adapted to be rotated conjointly with the capstans, two reels on which a tape cassette is to be loaded for record or playback, and two drive members adapted to be selectively coupled with a shaft of one or the other of said reels to take up a tape in said cassette, said first and second endless belts having portions coupled to the shaft of said motor, said first endless belt having portions engaging said drive members, said second endless belt having a portion engaging said flywheels, an interlocking selector member for forward/reverse feed, a fast forward/rewind selector member, two reel bases provided between said interlocking member and said selector member, a gear member, an intermediate gear disposed between the reel bases and arranged on said gear member, a first slidable member for operating the base portion of said gear member, a second slidable member arranged abreast with said first slidable member for operating the tip end of said gear member, a control projection for slidingly operating the tip end of said gear member, and first and second cam portions formed on said interlocking member and said selector member, respectively, for causing said first and second slidable members to slide, said gear member being slidably supported at its base end by said first slidable member, and said control projection being adapted to control said gear member, thereby to allow the modes of operation be switched between forward, reverse, fast forward and rewind modes.

6. A tape player as set forth in claim 5, wherein said ejecting lever comprises a first lever and a second lever, said first lever being provided with an operating portion and adapted to rotate said second lever, said fast-forward/rewind selector member being engaged with said first lever, thereby to carry out the ejection of the cassette when said second lever is caused to slide in association with the first lever.

7. A tape player as set forth in claim 5, which further comprises an ejecting lever setting table, a forward/reverse selector member slidably provided between an ejecting lever and said ejecting lever setting table, an engaging member provided on said ejecting lever for interlocking with said forward/reverse selector member at the time of ejection operation, a diagonal guide slot formed on the interlocking member for forward/reverse feed selection, and a projection provided on said forward/reverse selector member and engaged with said diagonal guide slot, thereby to be set in the forward mode whenever the cassette is ejected.

* * * * *